US012595803B2

(12) United States Patent
Bankestrom et al.

(10) Patent No.: US 12,595,803 B2
(45) Date of Patent: Apr. 7, 2026

(54) BEARING ARRANGEMENT OF A PUMP AND METHOD OF OPERATING

(71) Applicant: AKTIEBOLAGET SKF, Gothenburg (SE)

(72) Inventors: Olle Bankestrom, Västra Frölunda (SE); Pekka Korpelainen, Klaukkala (FI)

(73) Assignee: AKTIEBOLAGET SKF, Gothenburg (SE)

( * ) Notice: Subject to any disclaimer, the term of this patent is extended or adjusted under 35 U.S.C. 154(b) by 51 days.

(21) Appl. No.: 18/691,506

(22) PCT Filed: Sep. 8, 2022

(86) PCT No.: PCT/EP2022/074942
§ 371 (c)(1),
(2) Date: Mar. 13, 2024

(87) PCT Pub. No.: WO2023/046486
PCT Pub. Date: Mar. 30, 2023

(65) Prior Publication Data

US 2024/0376900 A1 Nov. 14, 2024

(30) Foreign Application Priority Data

Sep. 21, 2021 (DE) ......................... 102021210489.4

(51) Int. Cl.
*F04D 29/049* (2006.01)
*F04D 1/00* (2006.01)
(Continued)

(52) U.S. Cl.
CPC ............ *F04D 29/049* (2013.01); *F04D 1/00* (2013.01); *F04D 15/0088* (2013.01);
(Continued)

(58) Field of Classification Search
CPC ...... F04D 29/049; F04D 1/00; F04D 15/0088; F04D 27/001; F04D 29/041; F05D 2260/821
See application file for complete search history.

(56) References Cited

U.S. PATENT DOCUMENTS

| | | | | |
|---|---|---|---|---|
| 5,649,449 | A | 7/1997 | Algers | |
| 6,360,616 | B1 * | 3/2002 | Halliday | G01L 5/0009 73/862.49 |

(Continued)

FOREIGN PATENT DOCUMENTS

| | | | |
|---|---|---|---|
| CN | 112302963 | A | 2/2021 |
| DE | 102006011613 | A1 | 9/2007 |
| FR | 2894025 | A1 | 6/2007 |

OTHER PUBLICATIONS

International Search Report and Written Opinion dispatched Mar. 30, 2023 in related application No. PCT/EP2022/074942.

(Continued)

*Primary Examiner* — Andrew J Marien
(74) *Attorney, Agent, or Firm* — J-TEK LAW PLLC; Scott T. Wakeman; Mark A. Ussai

(57) ABSTRACT

A bearing arrangement of a centrifugal pump includes at least one rolling-element bearing configured to support an impeller shaft of the centrifugal pump and to support an axial load, an axial force sensor configured to measure a present axial force acting on the impeller shaft, a rotation speed sensor configured to measure a present rotation speed of the impeller shaft, a memory storing relationship data between each of a plurality of known volumetric flow rates at a plurality of known rotation speeds of the impeller shaft and a plurality of known axial forces acting on the impeller shaft, and a controller configured to determine a present volumetric flow rate through the centrifugal pump from the
(Continued)

relationship data and the measured present axial force and the measured present rotation speed.

20 Claims, 3 Drawing Sheets

(51) Int. Cl.
*F04D 15/00* (2006.01)
*F04D 27/00* (2006.01)
*F04D 29/041* (2006.01)

(52) U.S. Cl.
CPC ......... *F04D 27/001* (2013.01); *F04D 29/041* (2013.01); *F05D 2260/821* (2013.01)

(56) References Cited

U.S. PATENT DOCUMENTS

2004/0036621 A1* 2/2004 Morita .................... G01P 3/443 340/682
2013/0188897 A1* 7/2013 Reedman ........... G01D 5/35303 384/445
2018/0071443 A1 3/2018 Kallenbach et al.
2019/0390686 A1 12/2019 Will et al.
2020/0150643 A1* 5/2020 Cella ...................... G06N 3/047
2021/0131894 A1* 5/2021 Glaentz ................. F16C 19/542

OTHER PUBLICATIONS

"SKF Load Sensing Bearings—for pumps and compressors—Real-time load, speed and temperature sensing with fiber optics", Nov. 2019, pp. 1-12, published by SKF Group 2019.

L. Kahlman, "New Bearing Technology—Fibre Optic Sensing Enabling Industry 4.0", 2nd World Congress on Condition Monitoring, Marina Bay Sands, Singapore, Dec. 2-5, 2019, pp. 1-8.

Lars Kahlman, et al., "Fiber Optical Sensing Of Bearing Performance And Pump Conditions", 46th Turbomachinery & 33rd Pump Symposia, Houston, Texas, Dec. 11-14, 2017, pp. 1-21; Published by Turbomachinery Laboratory, Texas A&M Engineering Experiment Station.

* cited by examiner

BEARING ARRANGEMENT OF A PUMP AND METHOD OF OPERATING

CROSS-REFERENCE

This application is the U.S. National Stage of International Application No. PCT/EP2022/074942 filed on Sep. 8, 2022, which claims priority to German patent application no. 10 2021 210 489.4 filed on Sep. 21, 2021.

TECHNOLOGICAL FIELD

The present invention is related to a bearing arrangement of a pump and a method of operation of a bearing arrangement of a pump.

More particularly, the invention deals with determining the current volumetric liquid flow rate without a classic flowmeter.

BACKGROUND

Generally, flowmeters at the output of a pump are used to measure the current volumetric liquid flow rate through the pump.

Flowmeters are extra components which need to be assembled, maintained, and need space.

Moreover, flowmeters are expensive components, especially flowmeters for measuring high flow rates.

The document U.S. Pat. No. 5,649,449 discloses a method for determining the current operation condition of an operating centrifugal pump by measuring magnitude and direction of the radial forces imposed on the impeller of the pump.

These values are compared with previously measured or determined known values to identify the actual point along the pump characteristic curve at which the pump is operating, in particular the current volumetric liquid flow rate at the output of the pump.

However, for double volute centrifugal pumps, the radial loads relating to the two volutes are intended to balance out the resulting radial load so that the resulting radial load values are residual preventing the method from being implemented.

SUMMARY

According to an aspect, a bearing arrangement of a pump is proposed comprising:

- at least one rolling bearing being capable of carrying axial loads and supporting an impeller shaft of the pump,
- measuring means for an axial force acting on the impeller shaft,
- further measuring means for a revolution speed of the impeller or impeller shaft, and
- determining means comprising relationship data between volumetric liquid flow rates through the pump, said axial forces and said revolution speeds, and determining the liquid flow rate correlated to a measured axial force and revolution speed via said relationship data.

Preferably, the further measuring means are additionally for an input pressure of the pump particularly comprising a pressure sensor measuring the input pressure in a suction nozzle of the pump and the relationship data further comprise said input pressures.

Preferably, the bearing arrangement comprises a second bearing supporting the impeller shaft, the at least one and second bearings being assembled in back-to-back configuration.

Advantageously, the bearing arrangement comprises a third bearing supporting the impeller shaft, the at least one and second bearings assembled in back-to-back and the third bearing being paired in tandem.

Advantageously, the measuring means comprise a sensor measuring axial forces acting on the impeller shaft, particularly comprising at least one optical fiber, particularly comprising at least one fiber Bragg grating.

Preferably, the sensor is disposed on or in at least one bearing.

According to another aspect, a method of operating a bearing arrangement of a pump particularly a centrifugal pump comprising at least one rolling bearing being capable of carrying axial loads and supporting an impeller shaft of the pump, measuring means for an axial force acting on the impeller shaft, further measuring means for a revolution speed of the impeller or impeller shaft, and determining means comprising relationship data between volumetric liquid flow rates through the pump, said axial forces and said revolution speeds, is proposed comprising:

The axial force and the revolution speed are measured and the correlated liquid flow rate is determined via said relationship data.

The method permits to determine the volumetric liquid flow rate through the pump during normal operation of the pump without implementing flowmeters and thus simplifying the maintenance and the design of the pump, the method being not limited to a specific type of centrifugal pump and may be for example implemented for single or double volute centrifugal pumps.

Preferably, determining the axial forces acting on the impeller shaft at a particular current instant during normal operation comprises measuring the axial forces acting on the impeller shaft at the particular current instant during normal operation.

Advantageously, measuring axial forces acting on the impeller shaft comprises measuring a magnitude and a direction of the axial forces acting on the impeller shaft.

Preferably, measuring axial forces acting on the impeller shaft comprises measuring the axial forces at the said bearing supporting the impeller shaft.

BRIEF DESCRIPTION OF THE DRAWINGS

Other advantages and features of the invention will appear on examination of the detailed description of embodiments, in no way restrictive, and the appended drawings in which.

DETAILED DESCRIPTION

Figure 1:
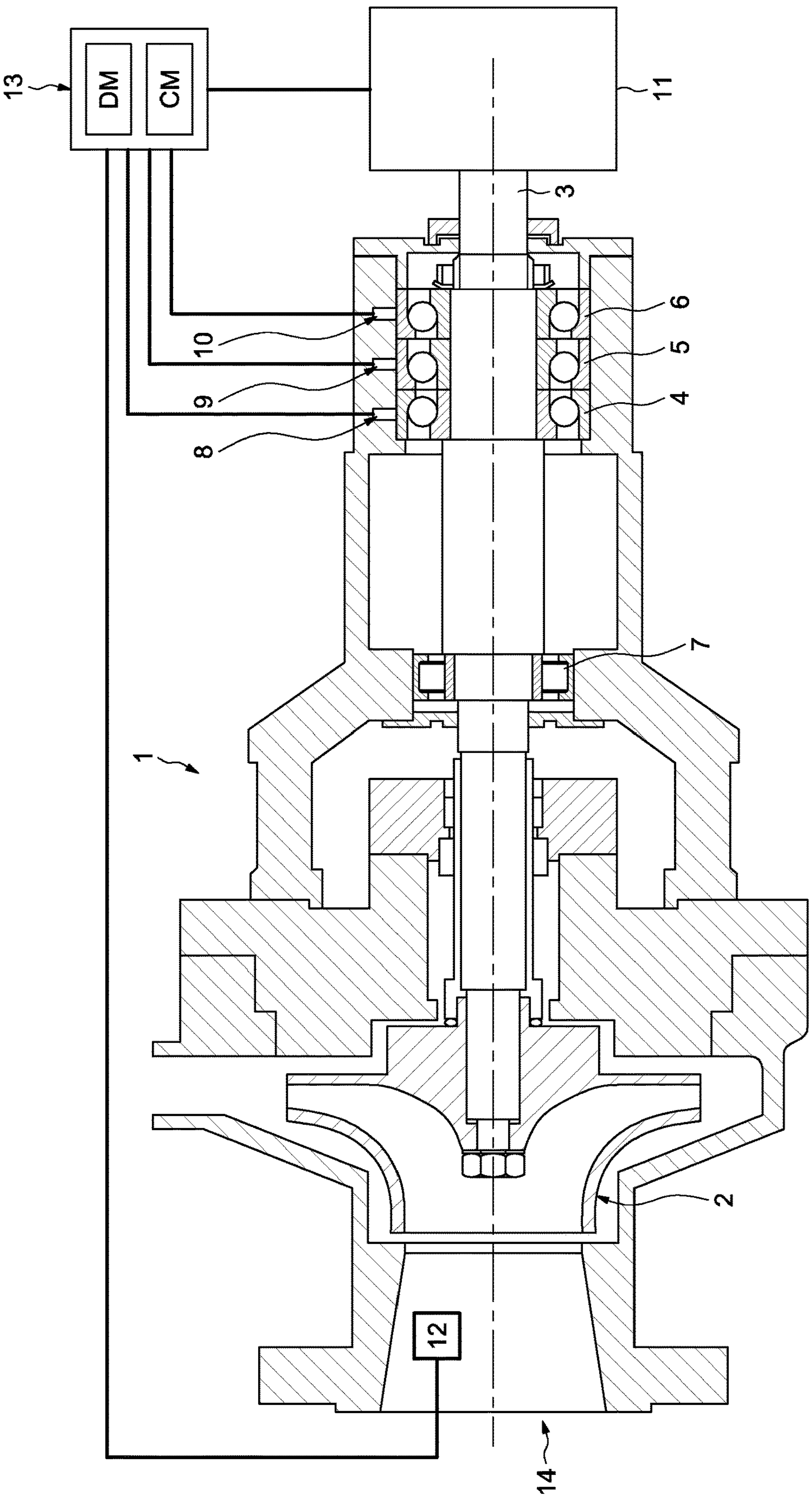
FIG. 1 illustrates schematically a section of a double volute centrifugal pump.

Reference is made to FIG. 1 which represents a section of a double volute centrifugal pump 1 comprising a pump housing including a rotatable impeller 2, an impeller shaft 3 carrying the impeller and four bearings 4, 5, 6, 7 supporting the impeller shaft 3, and a suction nozzle 14.

The impeller 2 is at one end of the impeller shaft 3.

A first, second and third bearings 4, 5, 6 are for example angular contact ball bearings and the fourth bearing 7 is for example a cylindrical roller bearing.

Other kind of bearings may be used, for example a double row angular contact ball bearing may replace the first, second and third bearings 4, 5, 6.

The second and third bearings 5, 6 are paired in tandem, and the first and second bearings 4, 5 are in a back-to-back configuration on one side of the impeller 2, and the fourth bearing 7 is closer to the impeller 2.

The second and third bearings 5, 6 paired in tandem may be located on the impeller shaft 3 to carry main axial load applied on the impeller shaft 3.

Figure 2:
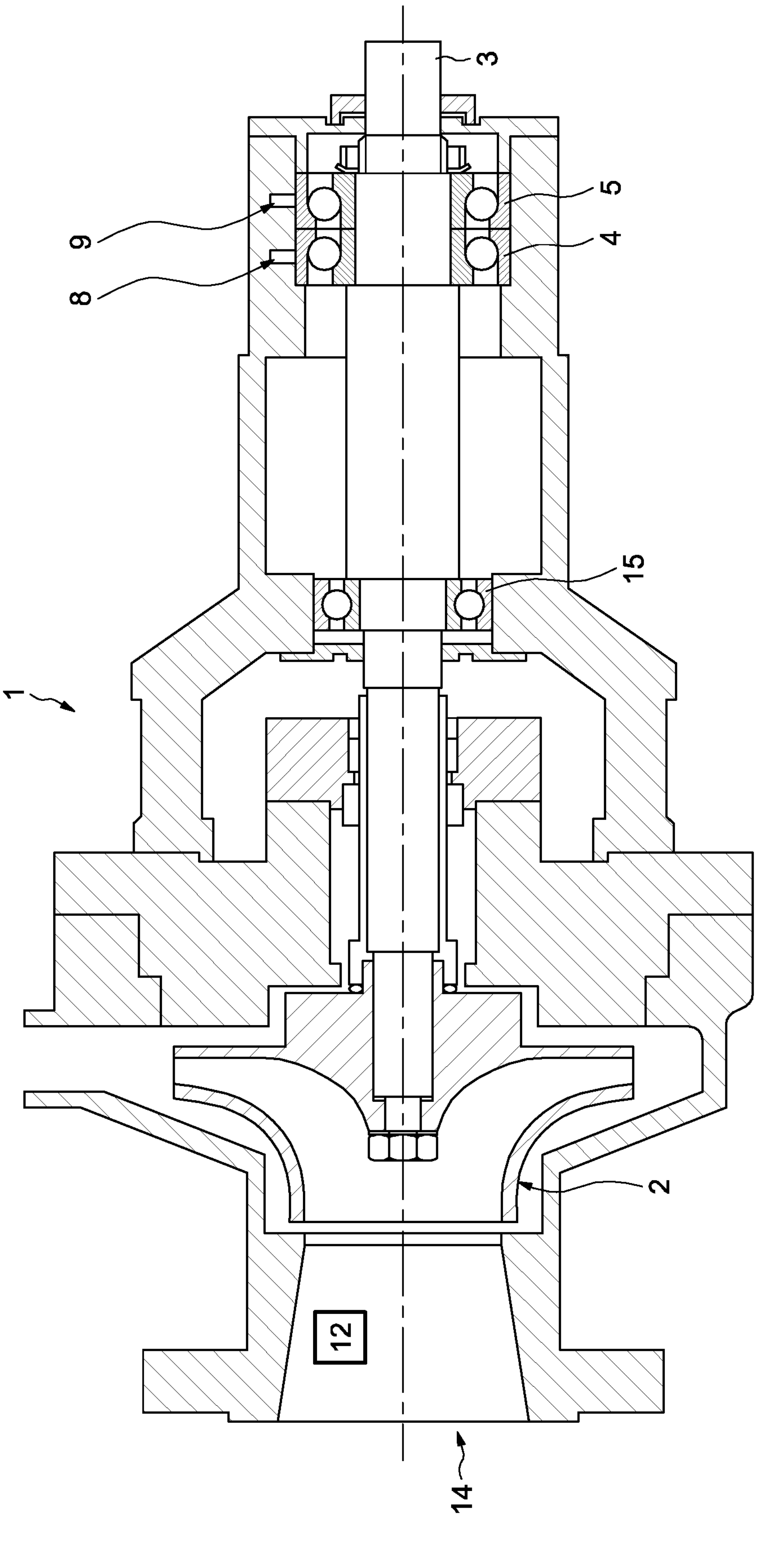
FIG. 2 illustrates schematically a section of a single volute centrifugal pump.

In another embodiment (FIG. 2) the centrifugal pump 1 is a single volute pump comprising the impeller shaft 3 supported by the first and second bearings 4 and 5 in a back-to-back configuration and by a fifth ball bearing 15.

The double volute centrifugal pump 1 comprises:

- first measuring means measuring axial forces acting on the impeller shaft,
- storage means DM comprising relationships F1 between volumetric liquid flow rates through the pump, speeds, axial forces, and input pressures,
- further measuring means determining the input pressure of the pump 1 and measuring the speed of the impeller, and
- calculation or determining means CM determining the instantaneous volumetric liquid flow rate of the pump 1 from the determined axial force and input pressure, the measured speed and the relationships F1.

The first measuring means comprise for example three fiber optical sensors 8, 9, 10 (FOS), each sensor 8, 9, 10 being disposed on or in a different angular contact ball bearing 4 to 6.

Figure 4:
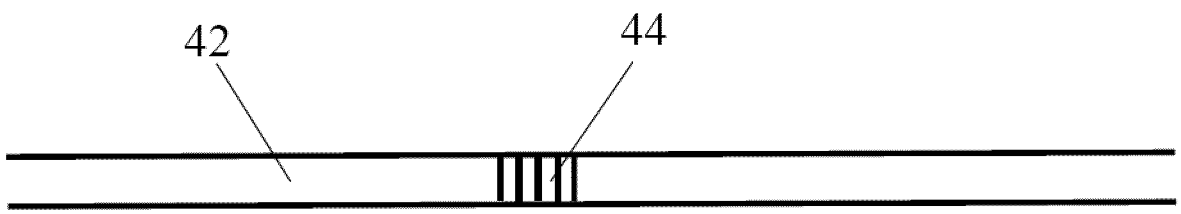
FIG. 4 illustrates an optical fiber with a fiber Bragg grating.

In another embodiment, the first measuring means comprise at least one fiber optical sensor 8, 9 and 10 (FOS) disposed on or in one angular contact ball bearing 4 to 6. FIG. 4 shows a section of a corresponding optical fiber 42 including a fiber Bragg grating 44.

In another embodiment, FOS sensors 8 to 10 may be located near the angular contact ball bearings 4 to 6, for example on the shaft 3. Thereby the sensor signal transmission may need to be wireless, particularly if the FOS sensors 8 to 10 are connected to a rotating part, whereas it can be based on wire, particularly if the FOS sensors 8 to 10 are connected to a non-rotating part like a housing.

Other kind of sensors able to measure axial loads on the impeller shaft 3 may be used.

Each FOS sensor 8, 9, 10 measures axial forces acting on the impeller shaft 3.

The further measuring means comprise for example a speed sensor 11 and a pressure sensor 12 measuring the input pressure in the suction nozzle 14 of the pump 1.

The storage means DM and calculating means CM are for example implemented in a controller 13, the controller 13 being connected to the FOS sensors 8, 9, 10, the speed sensor 11 and the pressure sensor 12.

The storage means DM and/or the calculating means CM may be located remotely near the pump 1 as shown on FIG. 1, or may be located in remote servers located for example several kilometers away from the pump 1, the controller 13 comprising communicating means to communicate with the remote servers.

In another embodiment, the double volute centrifugal pump 1 may be replaced by another type of pump, for example a single volute centrifugal pump.

In another embodiment, less than three bearings may be equipped with sensors and at least one bearing is equipped with a sensor.

Figure 3:
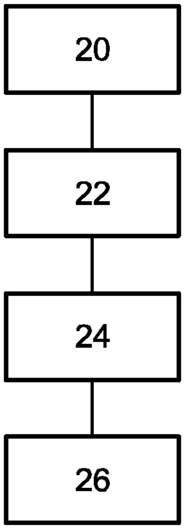
FIG. 3 illustrates an embodiment of a method for determining a volumetric liquid flow rate through the operating centrifugal pump.

FIG. 3 represents an embodiment of a method for determining a volumetric liquid flow rate through an operating centrifugal pump 1.

In step 20, during a testing operation of the pump, the controller 13 collects axial forces by the FOS sensors 8, 9, 10 at a plurality of volumetric liquid flow rates, speeds by the speed sensor 11 and pressures by the pressure sensor 12. Thereby the pressure can represent a pressure difference across the pump 1.

The axial forces acting comprises measuring a magnitude and a direction of the axial forces acting on the impeller shaft 3.

In step 22, the relationships F1 between the volumetric liquid flow rates through the pump, the speeds, the axial forces and the input pressures of the pump are transferred to the storage means DM.

The relationships F1 may be an equation linking the flow rate FL through the pump 1, the shaft speed $X_0$, the axial load $X_1$, and the input pressure $X_2$, F1 being equal to:

$$FL = F1(X_0, X_1, X_2, U) = U_0 + U_1 \cdot X_0 + U_2 \cdot X_0^2 + U_3 \cdot X_1 + U_4 \cdot X_0 \cdot X_1 + U_4 \cdot X_2 \quad (1)$$

where $U=\{U_0, U_1, U_2, U_3, U_4\}$ are constant empirically determined.

The relationships F1 are then used by the calculating means CM.

In step 24, at a particular current instant during normal operation of the pump 1, the sensor 11 measures the shaft speed and the pressure sensor 12 measures the input pressure at the particular current instant.

In another embodiment, the input pressure of the pump 1 is not taken into account, the coefficient $U_4$ being nil.

In step 26, the calculating means CM determine the instantaneous volumetric liquid flow rate of the pump 1 from the determined axial forces, the measured speed, the input pressure of the pump 1 and the relationships F1.

The corresponding method permits to determine the volumetric liquid flow rate through the pump 1 during normal operation of the pump 1 without implementing flowmeters and thus simplifying the maintenance and the design of the pump 1 and for example a control loop controlling the pump 1.

Such method enables to detect problems arising when the pump is operating, for example cavitation, and to counteract in order to preserve the pump from damages.

Further, such method is not limited to a specific type of centrifugal pump and may be for example implemented for single or double volute centrifugal pumps.

Moreover, any kind of axial load sensor may be implemented to determine the axial loads on the impeller shaft 3, for example piezo sensors or strain gauges.

The invention claimed is:

1. A bearing arrangement of a centrifugal pump comprising:

at least one rolling-element bearing configured to support an impeller shaft of the centrifugal pump and to support an axial load, first measuring means for measuring a present axial force acting on the impeller shaft, second measuring means for measuring a present rotation speed of the impeller shaft, storage means for storing relationship data between each of a plurality of known volumetric flow rates at a plurality of known rotation speeds of the impeller shaft and a plurality of known axial forces acting on the impeller shaft, and determining means for determining a present volumetric flow rate through the centrifugal pump from the relationship data and the measured present axial force and the measured present rotation speed.

2. The bearing arrangement according claim 1, wherein the first measuring means comprises an axial force sensor.

3. The bearing arrangement according to claim 1, including a pressure sensor configured to measure a present input pressure in a suction nozzle of the centrifugal pump, and wherein the relationship data includes a plurality of known input pressures.

4. The bearing arrangement according to claim 1 including a second rolling-element bearing configured to support the impeller shaft and wherein the at least one rolling-element bearing and the second rolling-element bearing are arranged in a back-to-back configuration.

5. The bearing arrangement according to claim 4, including a third rolling-element bearing configured to support the impeller shaft, and wherein the at least one rolling-element bearing and the second rolling-element bearing are arranged in the back-to-back configuration and the second and third rolling-element bearings are paired in tandem.

6. The bearing arrangement according to claim 5, wherein the axial force sensor is disposed on or in at least one bearing selected from a group consisting of: the at least one rolling-element bearing, the second rolling-element bearing and the third rolling-element bearing.

7. The bearing arrangement according to claim 1, wherein the relationship data is specific to a design and configuration of the centrifugal pump.

8. The bearing arrangement according claim 1, wherein the first measuring means comprises an axial force sensor including an optical fiber having a Bragg grating.

9. The centrifugal pump including:

the bearing arrangement according to claim 1 supporting the impeller shaft, and an impeller mounted on the impeller shaft.

10. A method of operating the centrifugal pump having the impeller shaft supported by the bearing arrangement according to claim 1, the method comprising:

measuring the present axial force acting on the impeller shaft, measuring the present rotation speed of an impeller, and determining the present volumetric flow rate through the centrifugal pump from the measured present axial force and the measured present rotational speed and from the relationship data.

11. The method according to claim 10, wherein the measuring the present axial force comprises measuring the present axial force with a force sensor including an optical fiber having at least one Bragg grating.

12. The method according to claim 11, wherein the relationship data is specific to the centrifugal pump.

13. A bearing arrangement of a centrifugal pump comprising:

at least one rolling-element bearing configured to support an impeller shaft of the centrifugal pump and to support an axial load, an axial force sensor configured to measure a present axial force acting on the impeller shaft, a rotation speed sensor configured to measure a present rotation speed of the impeller shaft, a memory storing relationship data between each of a plurality of known volumetric flow rates at a plurality of known rotation speeds of the impeller shaft and a plurality of known axial forces acting on the impeller shaft, and a controller configured to determine a present volumetric flow rate through the centrifugal pump from the relationship data and the measured present axial force and the measured present rotation speed.

14. The bearing arrangement according to claim 13, including a pressure sensor configured to measure a present input pressure in a suction nozzle of the centrifugal pump, wherein the relationship data includes a plurality of known input pressures.

15. The bearing arrangement according to claim 13, wherein the relationship data is specific to a design and configuration of the centrifugal pump.

16. The bearing arrangement according claim 13, wherein the axial force sensor comprises an optical fiber having a Bragg grating.

17. The centrifugal pump including:

the bearing arrangement according to claim 13 supporting the impeller shaft, and an impeller mounted on the impeller shaft.

18. A method of operating the centrifugal pump having the impeller shaft supported by the bearing arrangement according to claim 13, the method comprising:

measuring the present axial force acting on the impeller shaft, measuring the present rotation speed of the impeller, and determining the present volumetric flow rate through the centrifugal pump from the measured present axial force and the measured present rotational speed and from the relationship data.

19. The method according to claim 18, wherein the measuring the present axial force comprises measuring the present axial force with a force sensor including an optical fiber having at least one Bragg grating.

20. The method according to claim 19, wherein the relationship data is specific to the centrifugal pump.

* * * * *